(12) United States Patent
Whitman et al.

(10) Patent No.: US 8,615,710 B2
(45) Date of Patent: Dec. 24, 2013

(54) COMPUTER-IMPLEMENTED SYSTEMS AND METHODS FOR PORTLET MANAGEMENT

(75) Inventors: Lisa Whitman, Cary, NC (US); Susan Faye Hannum, Cary, NC (US); Jennifer S. Zhang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1331 days.

(21) Appl. No.: 11/853,233

(22) Filed: Sep. 11, 2007

(65) Prior Publication Data

US 2009/0070713 A1 Mar. 12, 2009

(51) Int. Cl.
*G06F 3/00* (2006.01)
*G06F 3/048* (2013.01)

(52) U.S. Cl.
USPC .......................................... 715/742; 715/781

(58) Field of Classification Search
USPC ......... 715/760, 733, 742, 795, 790, 788, 781, 715/796, 797, 779, 810, 842
See application file for complete search history.

(56) References Cited

U.S. PATENT DOCUMENTS

| | | | |
|---|---|---|---|
| 5,694,561 A * | 12/1997 | Malamud et al. | 715/805 |
| 5,995,103 A * | 11/1999 | Ashe | 715/804 |
| 6,011,552 A * | 1/2000 | Ramanathan et al. | 715/803 |
| 7,146,563 B2 | 12/2006 | Hesmer et al. | |
| 7,149,982 B1 * | 12/2006 | Duperrouzel et al. | 715/788 |
| 7,484,181 B2 * | 1/2009 | Duperrouzel et al. | 715/788 |
| 7,595,810 B2 * | 9/2009 | Louch | 345/629 |
| 2005/0278650 A1 * | 12/2005 | Sims et al. | 715/778 |
| 2006/0015846 A1 * | 1/2006 | Fraleigh et al. | 717/109 |
| 2006/0070002 A1 | 3/2006 | Guido et al. | |
| 2006/0184882 A1 | 8/2006 | Molander et al. | |
| 2006/0224989 A1 * | 10/2006 | Pettiross et al. | 715/779 |
| 2006/0224991 A1 * | 10/2006 | Stabb et al. | 715/781 |
| 2007/0006083 A1 | 1/2007 | Daniels et al. | |
| 2008/0052642 A1 * | 2/2008 | Champion et al. | 715/862 |

OTHER PUBLICATIONS

Abdelnur, Alejandro et al., JAVA™ Portlet Specification Version 1.0, pp. 1-132 [Oct. 7, 2003].

Hepper, Stefan, JAVA™ Portlet Specification Version 2.0, Early Draft 1., pp. 1-215 [Jul. 19 ,2006].

* cited by examiner

*Primary Examiner* — Rashawn Tillery

(74) *Attorney, Agent, or Firm* — Kilpatrick Townsend & Stockton LLP

(57) ABSTRACT

Computer-implemented systems and methods for interacting with a portal page. A user interface mechanism is displayed to a user. The user interface mechanism indicates to the user that a first portlet displayed in the portal page is in a maximized state and that the remaining portlets are not in a maximized state and are accessible by the user.

12 Claims, 13 Drawing Sheets

MATCH TO FIG.6B

COMPUTER-IMPLEMENTED SYSTEMS AND METHODS FOR PORTLET MANAGEMENT

TECHNICAL FIELD

This document relates generally to computer-implemented portlets and more particularly to computer-implemented management of portlets.

BACKGROUND

A portlet is an area that displays information (such as a list of links for web pages, a graph displaying business statistics, or other data) on a portal page created in a portal application. Each portal page created by a portal user can contain any number of portlets in a customizable arrangement.

Portlets must meet the Java Portlet Specification (JSR-168) development standard specification for portal applications, which specifies how portlets must function and be displayed. JSR-168 defines a set of application program interfaces for interaction between the portal page and the portlet, addressing operation preferences determined by a user.

Under JSR-168, portlets appear as mini-windows within a portal page, and can be in one of three display states: minimized, normal or maximized. Users invoke different display states through commands. In a normal state, all portlets in the portal page are visible. When a portlet is maximized, it occupies the entire area of a portal page, obscuring other portlets. When a portlet is minimized, only the portlet title bar can be seen on the portal page.

Current portal management approaches have one or more issues, such as when a portlet is placed in the maximized state, the portlet widens to consume the entire area of the page, and the other portlets that were arranged on that page are no longer shown. There is no indication that any other portlet is or can be displayed on that page.

SUMMARY

In accordance with the teachings provided herein, systems and methods for operation upon data processing devices are provided for interacting with a portal page. As an example, a user interface mechanism is displayed to a user. The user interface mechanism indicates to the user that a first portlet displayed in the portal page is in a maximized state and that the remaining portlets are not in a maximized state and are accessible by the user.

As another example, a system and method can include an input mechanism (e.g., software instructions) that is configured to receive state information about the one or more portlets. Based upon the state information, a user interface presentation and interaction mechanism is provided such that it is visible only when any portlet on a portal page is in a maximized state. The presentation tells a user that the portlet that is visible is maximized, and other portlets that might exist on the page are obscured and still accessible. The interaction mechanism provides a user with visual reassurance of the presence of the other portlets, as well as a quick shortcut to view a different portlet in a maximized state.

As yet another example, a system and method can be configured to provide a way to signify to a user through a graphical user interface that other portlets are hidden, such as by providing a portal user with a visual cue that the currently shown portlet is maximized (which display state obscures the visual display of the other portlets). A user is allowed via with an interaction mechanism to switch which portlet is shown as maximized, or to restore all portlets to their normal state.

DETAILED DESCRIPTION

Figure 1:
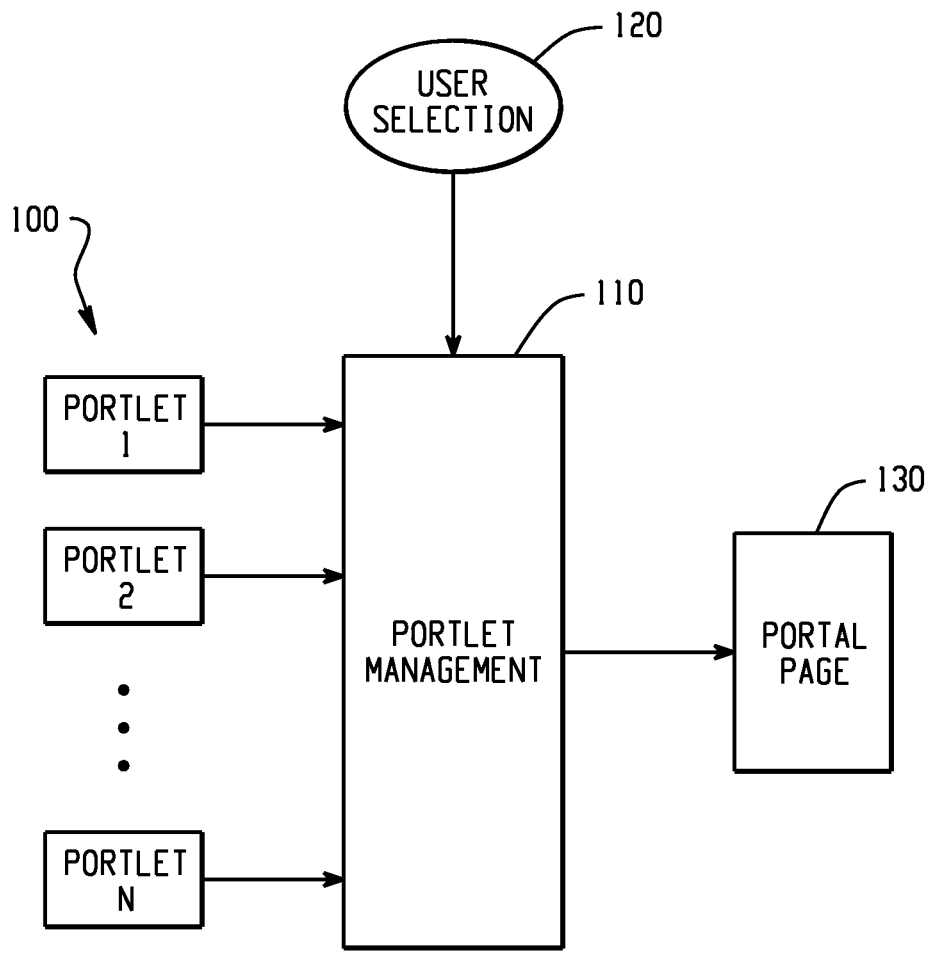
FIG. 1 is a block diagram depicting a portlet management system for facilitating the interaction between a user and one or more portlets that are displayed on a portal page.

FIG. 1 depicts a portlet management system 110 for facilitating the interaction between a user and one or more portlets 100 that are displayed on a portal page 130. The portlets 100 can provide to the user a wide range of information and functionality. For example, a portlet can display a list of links for web pages, a graph displaying business statistics, or other data. Accordingly, almost any form of information or application can be displayed in a portlet.

Through the portlet management system 110, a user can make a selection 120 that controls the display of the portlets 100 on the portal page 130. As an illustration, the portlet management system 110 can receive display state information about the portlets 100 (e.g., whether minimized, maximized, etc.), and based upon that information, the system 110 can provide an indication to the user about the availability of one or more of the portlets that may have become obscured because of another portlet.

Figure 2:
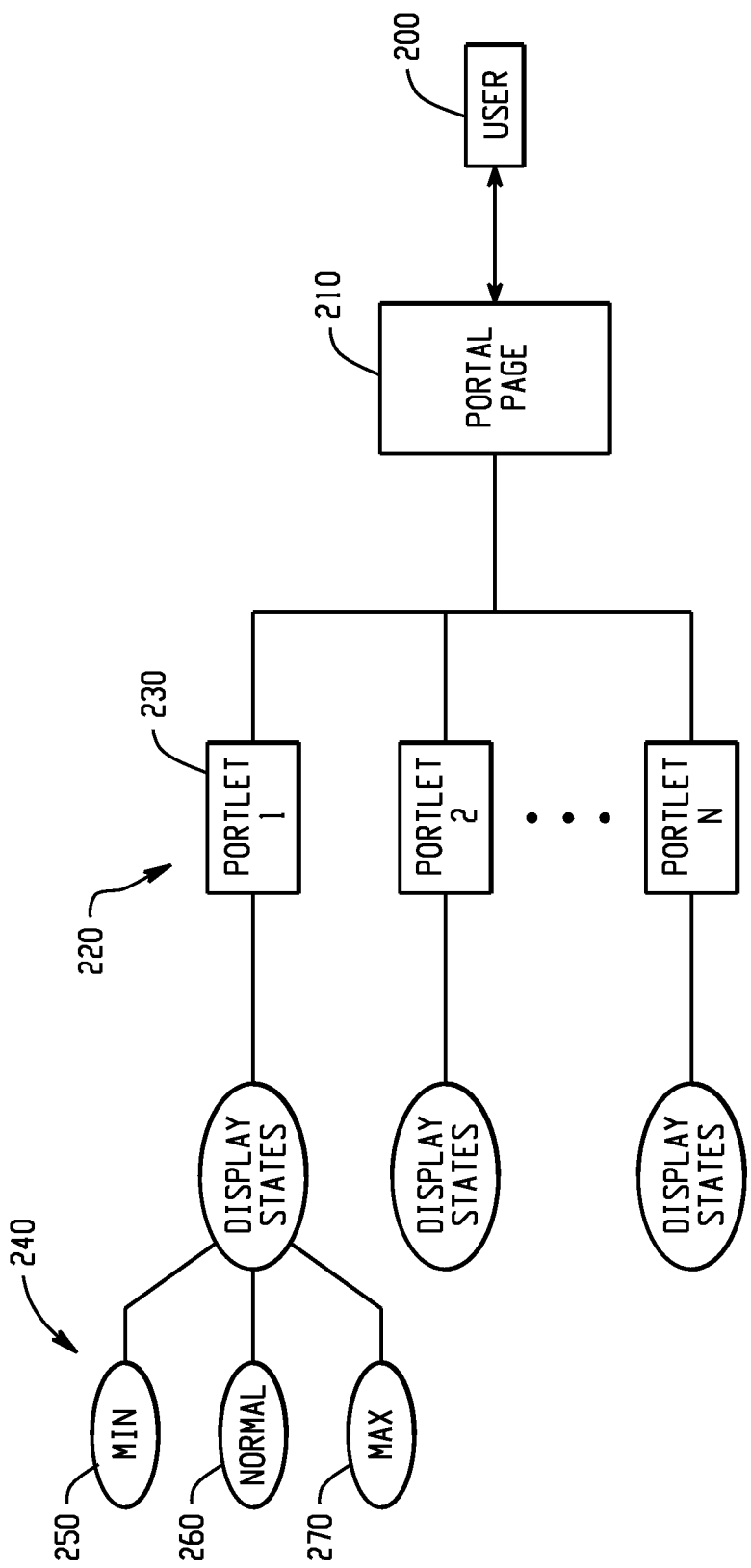
FIG. 2 is a block diagram depicting various portlet display states.

As a further illustration, FIG. 2 depicts portlets 220 appearing on portal page 210 and which can be in various display states 240. For example, portlet 230 can have such display states 240 as a minimized state 250, a normal state 260 and a maximized state 270. Each portlet is able to be in one of the display states 240; however, it is noted that in the example of FIG. 2 only one portlet is specifically illustrated with the plurality of display states 240 as a representative example.

Figure 3:
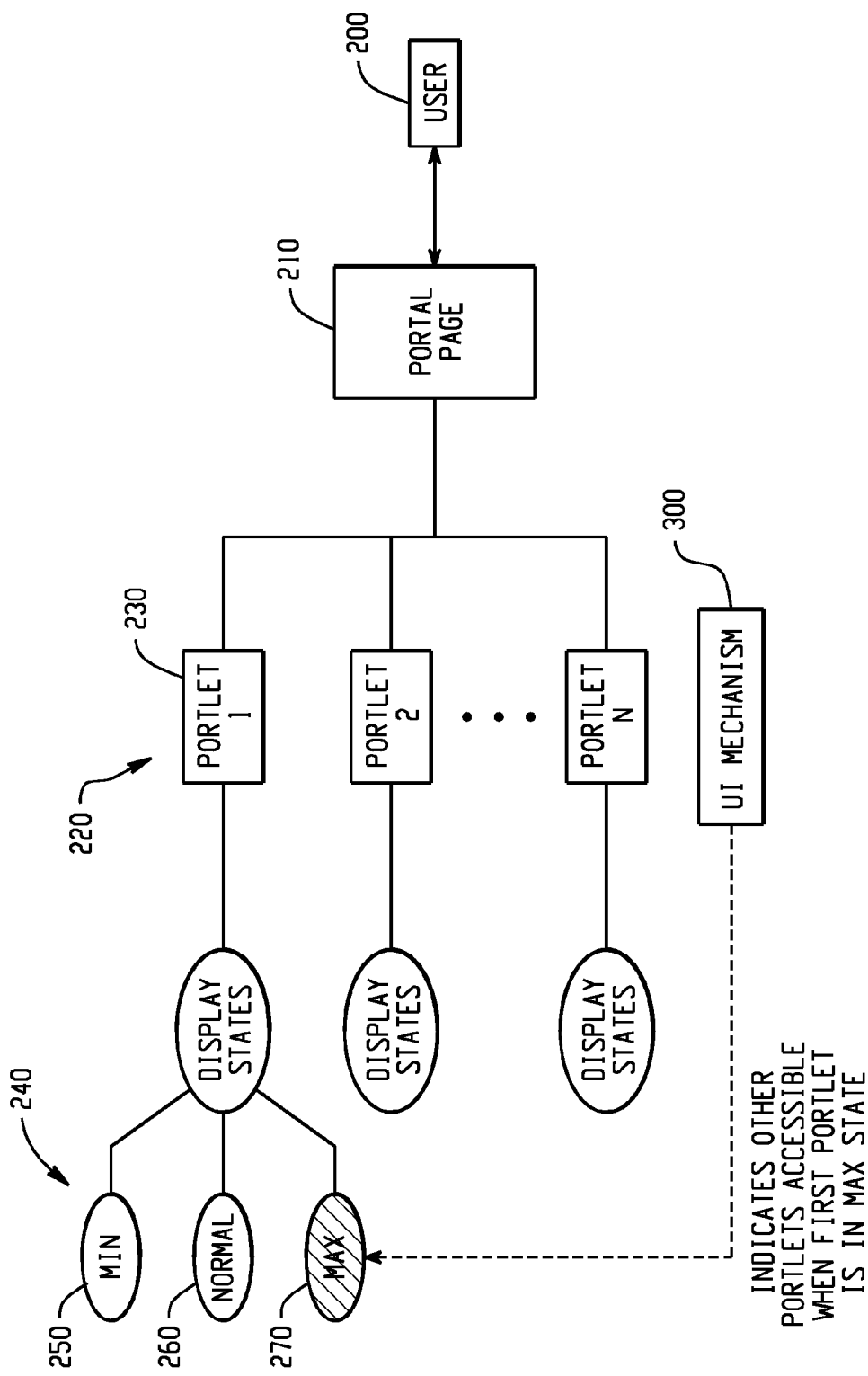
FIG. 3 is a block diagram depicting a maximized display state of a portlet.

In FIG. 3, the maximized display state 270 is shaded to indicate that in this example portlet 230 is maximized. Being in a maximized state, portlet 230 occupies the entire area of the portal page, thereby causing the other portlets in the portal page to be obscured and no longer visible to the user.

A user interface mechanism 300 provides one or more indicators that other portlets are accessible when a first portlet 230 is in a maximized state. The user interface mechanism 300 provides a portal user with a visual cue that portlet 230 is in a maximized state 270, and that the other portlets that might exist on the portal page are obscured, but are still accessible. In this way, the user interface mechanism 300 provides a portal user with visual reassurance of the presence of the other portlets. In other words, because of user interface mechanism 300, the portal user would not need to be concerned about the other portlets not being visible because the user can readily refer to the user interface mechanism 300 and ascertain that the other portlets on the portal page are obscured but are still accessible.

Figure 4:
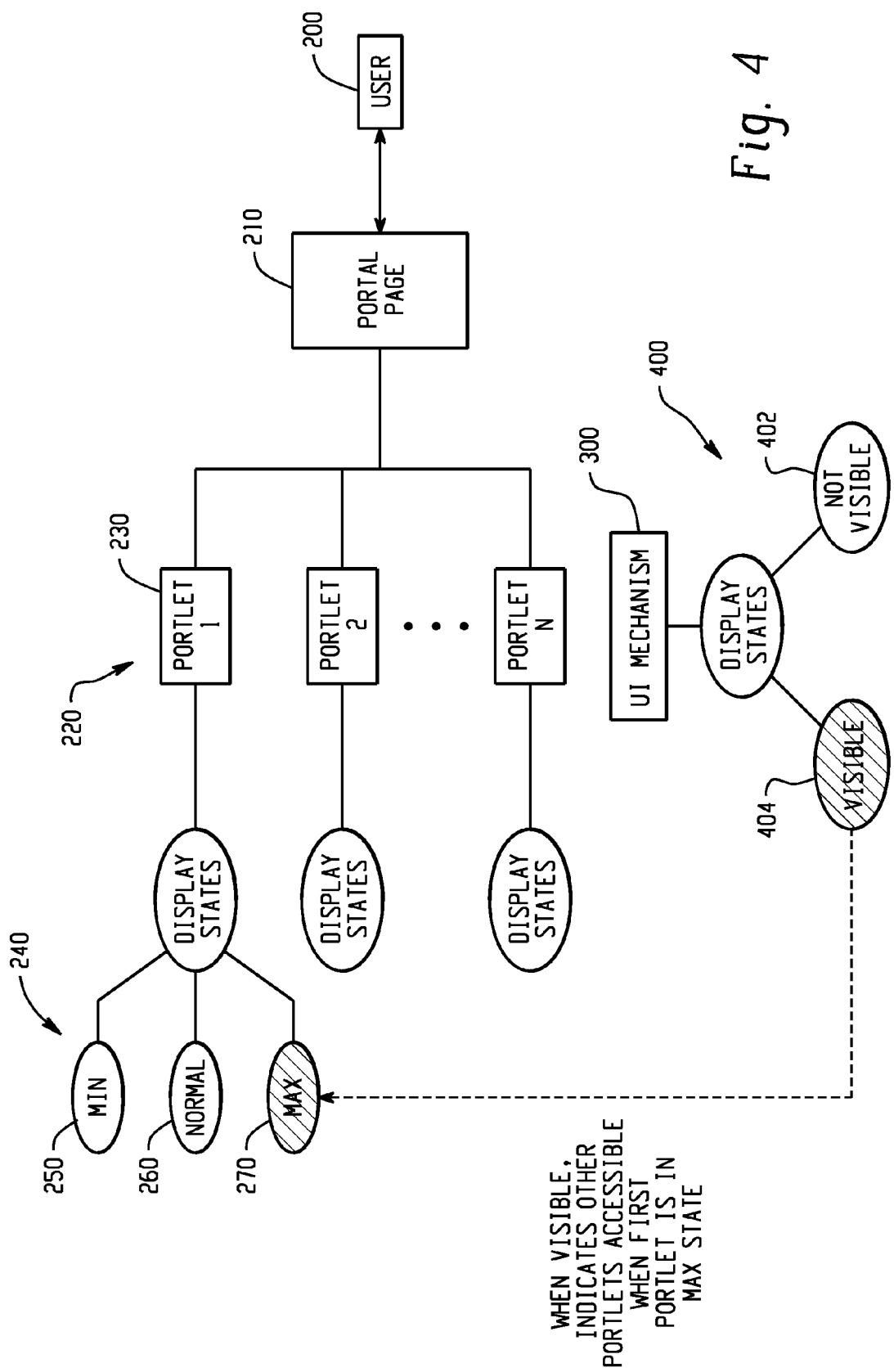
FIG. 4 is a block diagram depicting a user interface mechanism providing information regarding the display states of the portlets.

FIG. 4 illustrates that a user interface mechanism can be configured to indicate not only that other portlets are accessible when a first portlet 230 is in a maximized state but also provide further details regarding the display states of the portlets 220. For example, the user interface mechanism 300 can be configured to be in one of two display states 400. The display states 400 include a visible display state 404 and a display state 402 representative of when the user interface mechanism is not visible. User interface mechanism 300 operates in the latter display state (i.e., display state 402) by default if desired, but switches to the visible display state 404 when portlet 230 is displayed in a maximized state 270. Thus, the user interface mechanism 300, when visible, indicates that other portlets are accessible when the first portlet is maximized.

It should be understood that similar to the other processing flows described herein, the steps and the order of the steps described with respect to how the display states 400 of the user interface mechanism 300 may be altered, modified, removed and/or augmented and still achieve the desired outcome. As an illustration, user interface mechanism 300 does not need to be visible, such as when none of the portlets 220 are maximized, thereby avoiding occupying space on the display. The user may configure the display to be set based upon on the size of the display and/or the preferences of a user. Even when a portlet is maximized, the user may not want to see the user interface mechanism 300 all the time. Again, user preferences can vary the display states 400 of the user interface mechanism 300. The user interface mechanism 300 can be switched to the visible display state 404 when needed. This provides a way for the user to know that not only are other portlets being obscured but that they are still accessible.

Figure 5:
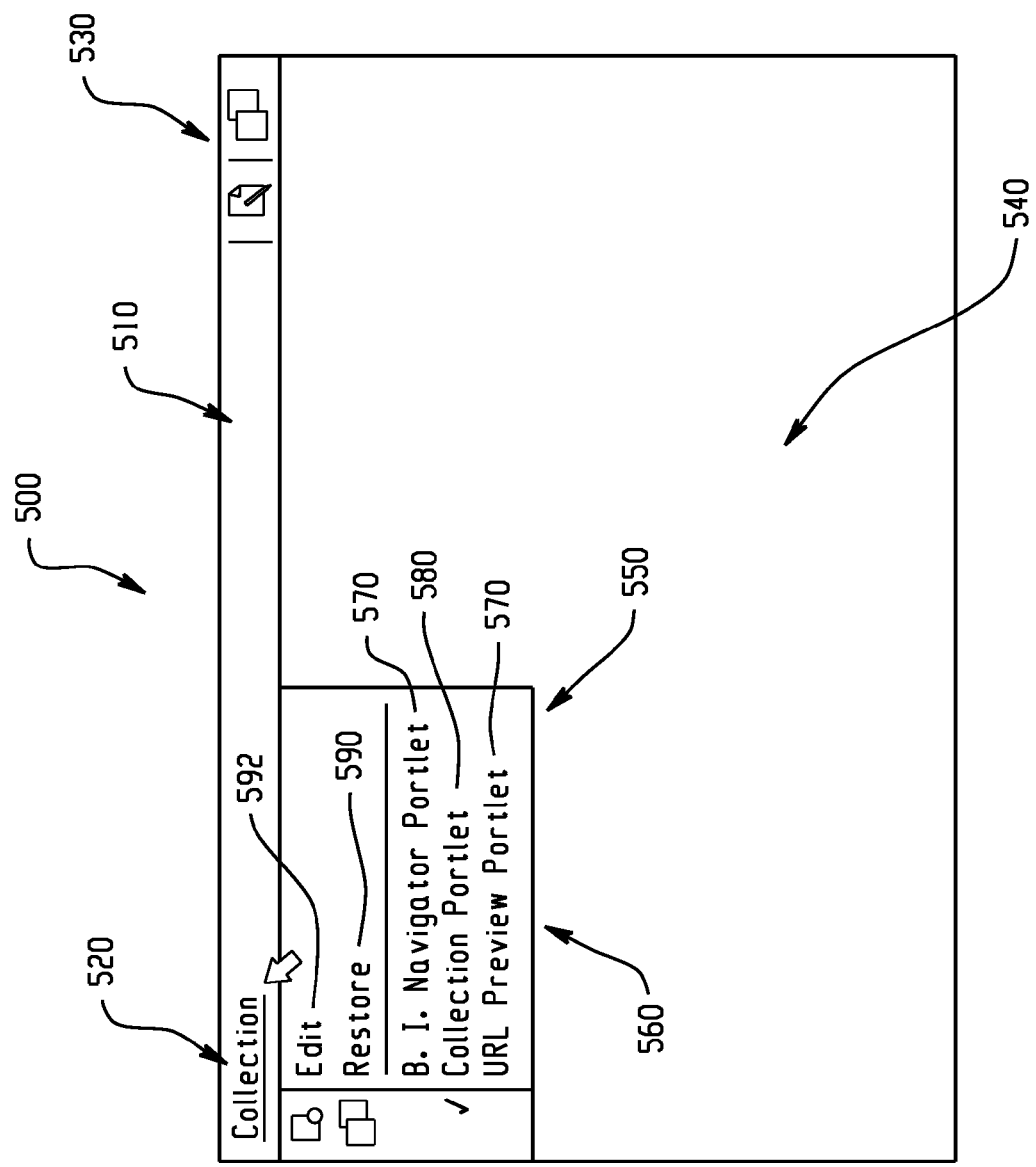
FIG. 5 is a graphical user interface illustrating an example of a portlet in a maximized state.

FIG. 5 is a graphical user interface illustrating an example of a portlet 500 in a maximized state. The portlet 500 includes in this example: a portlet title bar 510 (comprised of a portlet title 520 and title bar user interface items 530); and a portlet display area 540. The portlet title 520 reflects the title of the portlet which is in a maximized state. Title bar user interface items 530 include user interface items for editing the portlet and restoring the portlet to its normal size.

In this example, a user interface mechanism in the form of a portlet management menu 550 appears when a user clicks on a portlet title of the portlet in a maximized state. The portlet management menu 550 includes a list 560 of accessible portlets 570 and the currently maximized portlet 580. The portlet management menu 550 can also include other items, such as the edit and restore menu user interface items 590.

Maximized portlet 580 has a check mark indicator next to it in the portlet management menu 550 to indicate which portlet is maximized. The list 560 permits users to see that the other portlets on the page are still on the page, just obscured by the maximized portlet. Additionally, the list 560 provides a way for a user to switch which portlet is displayed in the maximized state. Clicking on one of the names of one of the hidden portlets 570 will cause that portlet to become maximized. Thus, the portlet management menu 550 allows a user to easily switch which portlet is shown as maximized. As an illustration, this allows users to maximize a different portlet without first having to restore all of the portlets and then selecting which portlet to maximize.

Other menu interface items may also be present, such as restore and edit user interface items (590 and 592). The restore interface item 590 enables a user to restore all portlets to their normal state, so that all portlets are again visible. It is noted that a JSR-168 compliant portlet has a normal button in the right portion of the portlet title bar. But this restore icon alone is not sufficient to indicate to the user that other portlets are accessible and does not indicate which portlets are obscured by the maximized portlet or provide one-click access to the content of those portlets. Additionally, the edit interface item 592 enables a user to place the page in an edit mode, whereby a user can edit portlet preferences.

Figure 6A:
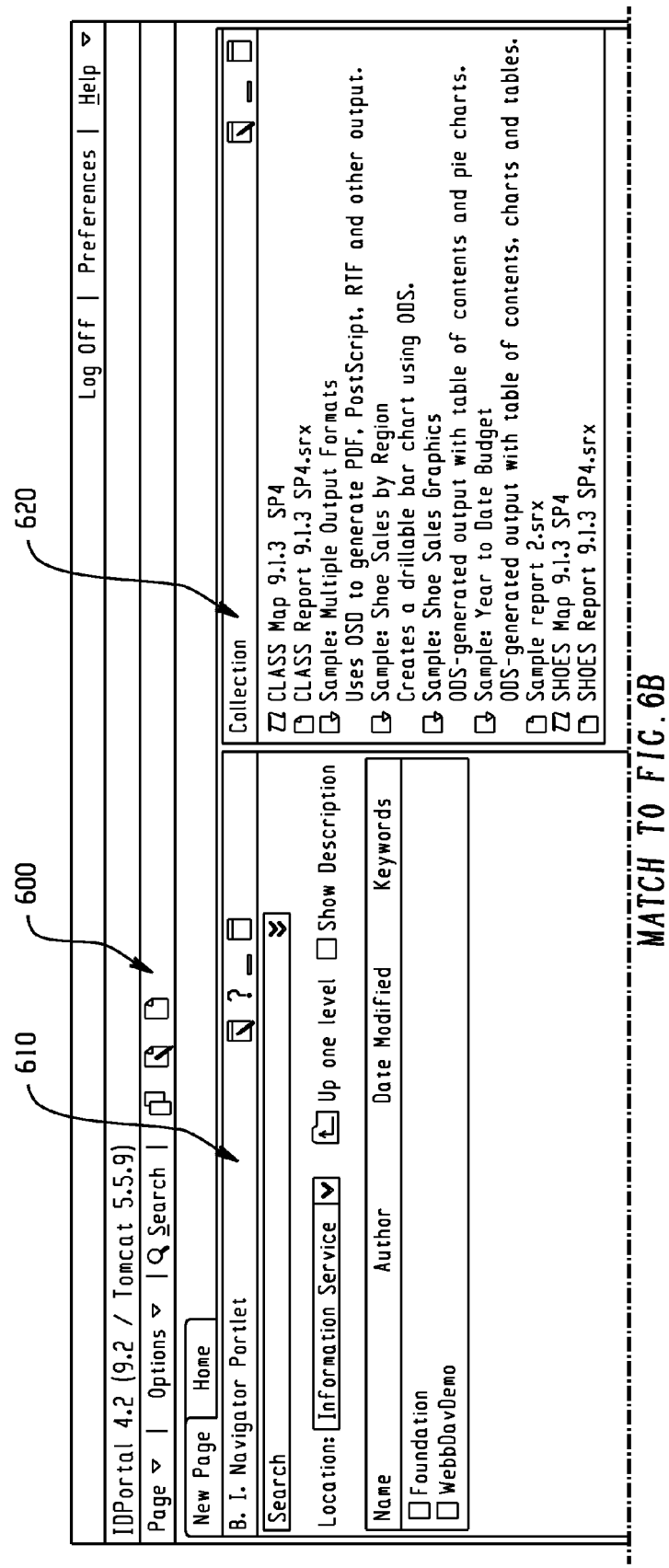
FIG. 6 is a graphical user interface having a portal page with multiple portlets displayed in their normal state therein.
Figure 6B:
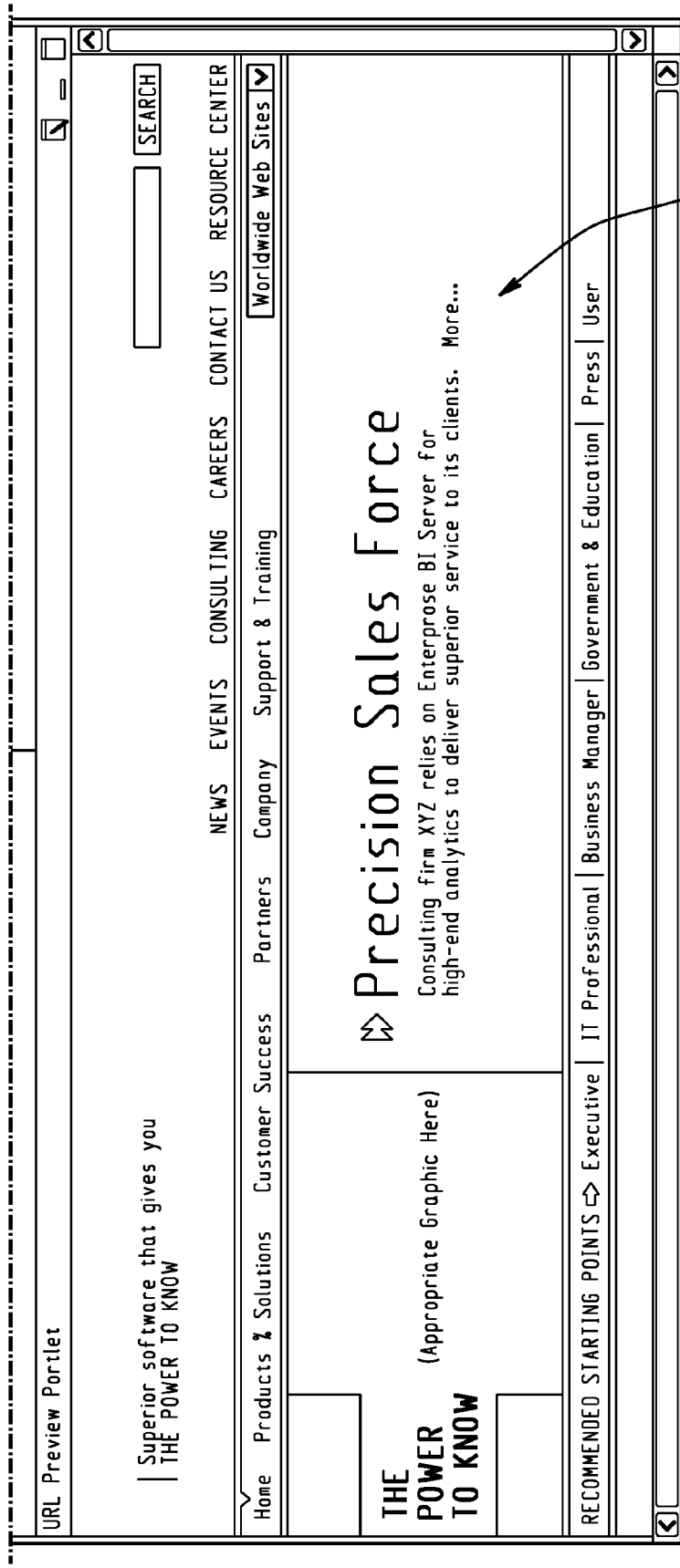

FIG. 6 is an example of a graphical user interface having a portal page 600 with multiple portlets (610, 620, and 630) displayed in their normal state. The portlet page 600 is entitled "New Page."

Each portlet (610, 620, and 630) displays different information to the user. For example, portlet 610, entitled "SAS B.I. Navigator Portlet," provides access to various databases. Portlet 620, entitled "Collection," shows various documents that use Microsoft's Open Data Services to generate data. And portlet 630, entitled "SAS URL Preview Portlet," displays content of a website.

Figure 7:
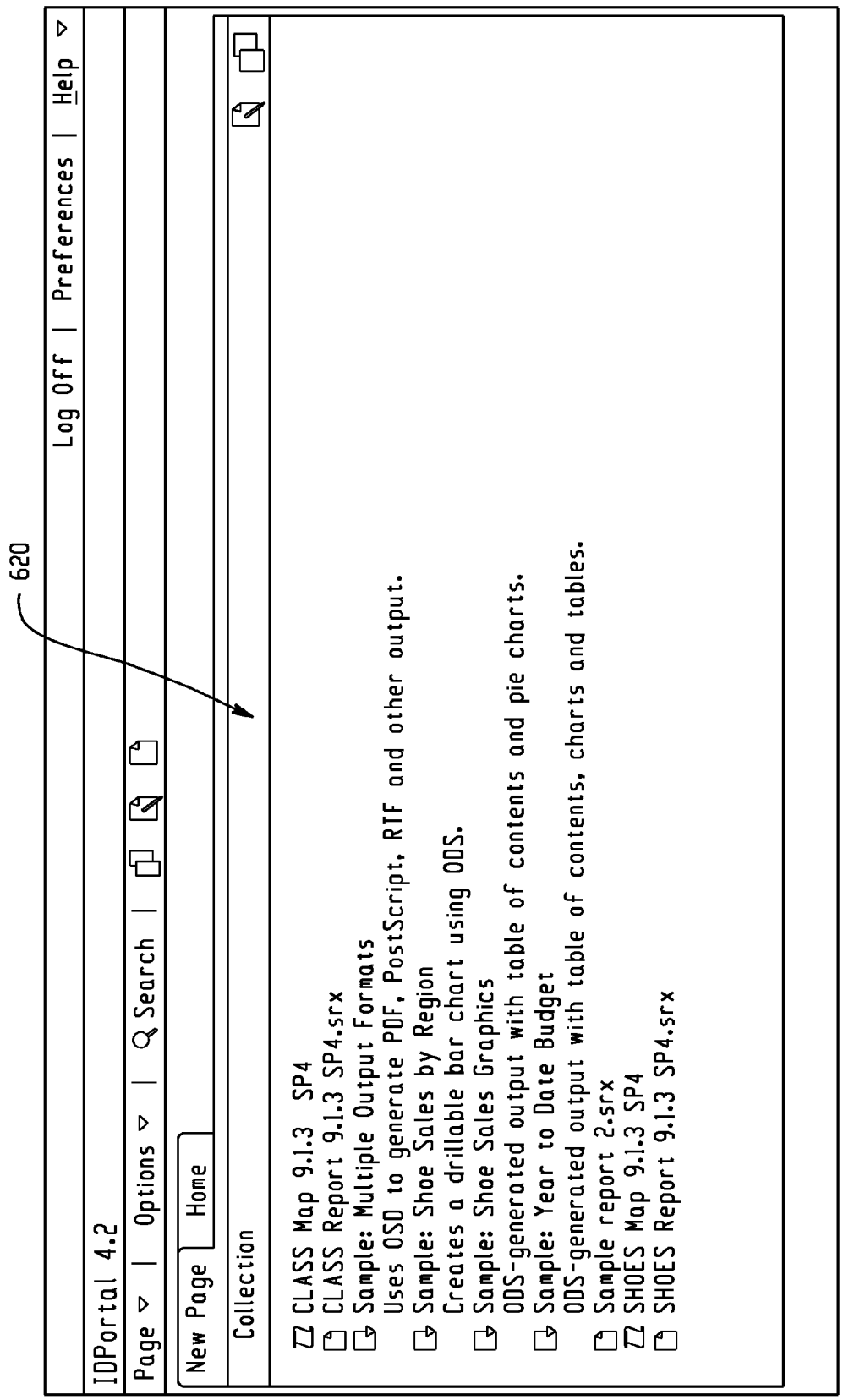
FIG. 7 is a graphical user interface illustrating a portlet being displayed in a maximized state.

FIG. 7 illustrates the portlet 620 of FIG. 6 being displayed in a maximized state. With portlet 620 being in a maximized state, the only portlet visible is portlet 620 because it occupies the entire or substantially all of the display region of the portal page.

Figure 8:
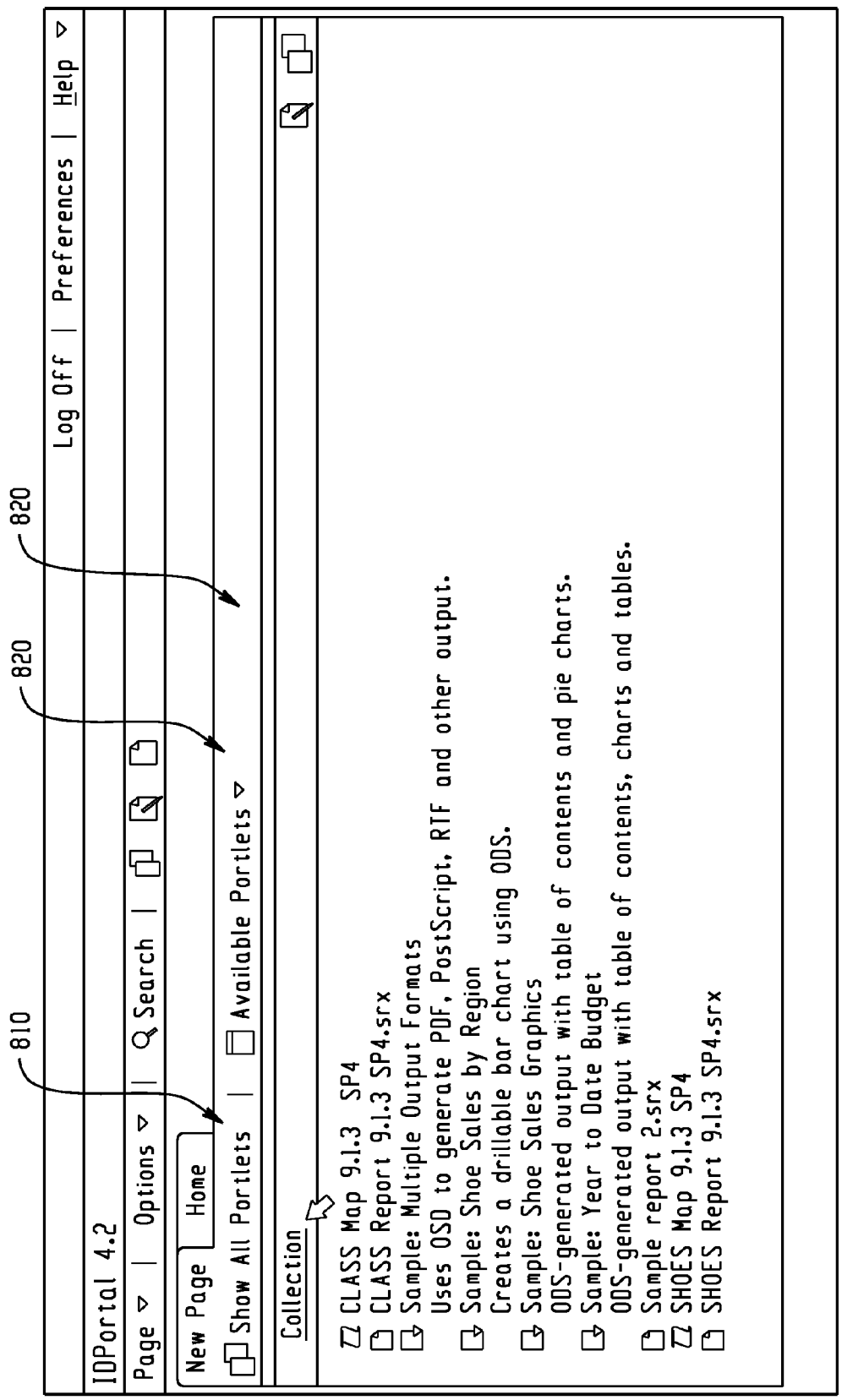
FIG. 8 is a graphical user interface illustrating a toolbar.

FIG. 8 depicts a toolbar 800, comprising additional user interface items 810 ("Show All Portlets") and 820 ("Available Portlets"), appearing above the title bar of portlet 620. Toolbar 800 appears when a portlet is in the maximized state, and is designed to signify to a user that the other portlets on the page are obscured from view by the maximized portlet but are still accessible. Toolbar 800 can be configured to appear when a user moves the mouse arrow (or other user interface device) near the title of the portlet, or it can appear whenever a first portlet is maximized. User interface item 810 ("Show All Portlets") performs a restoring function which returns all portlets to their normal size, thereby making all of the portlets visible to the user. User interface item 820 ("Available Portlets") lists all available portlets, thereby reassuring the user that none of the portlets have been lost and all remain accessible.

Figure 9:
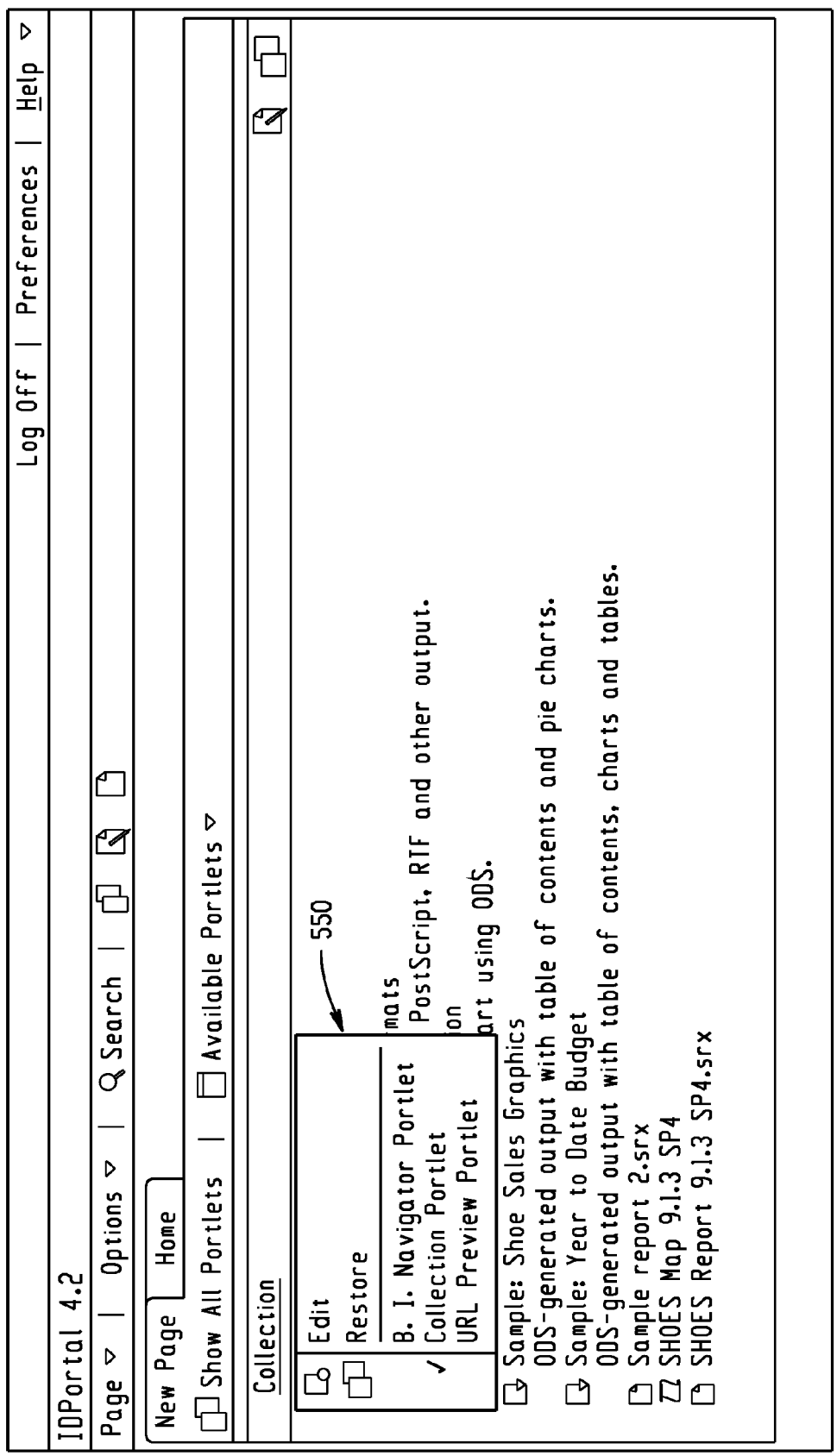
FIG. 9 is a graphical user interface illustrating a portlet management menu that has been switched to a visible display state.

FIG. 9 depicts a portlet management menu 550 that has been switched to a visible display state. The portlet management menu 550 provides menu user interface items and a list of portlets. The portlet management menu 550 shows that the portlet entitled "Collection Portlet" is maximized by providing a check mark next to the name of the portlet. The portlet management menu 550 also shows that there are two other portlets in the portal page ("SAS B.I. Navigator Portlet" and "SAS URL Preview Portlet") that are obscured but accessible. Users are able to select other portlets from the list of portlets in the portlet management menu 550 for viewing in a maximized state. As an illustration, a user could switch the portlet displayed in the maximized state by selecting "SAS URL Preview Portlet." When the user selects another portlet, the previously maximized portlet (i.e., "Collection Portlet") would be obscured and the selected portlet ("SAS URL Preview Portlet") would be maximized. A check mark would then appear next to "SAS URL Preview Portlet."

Figure 10:
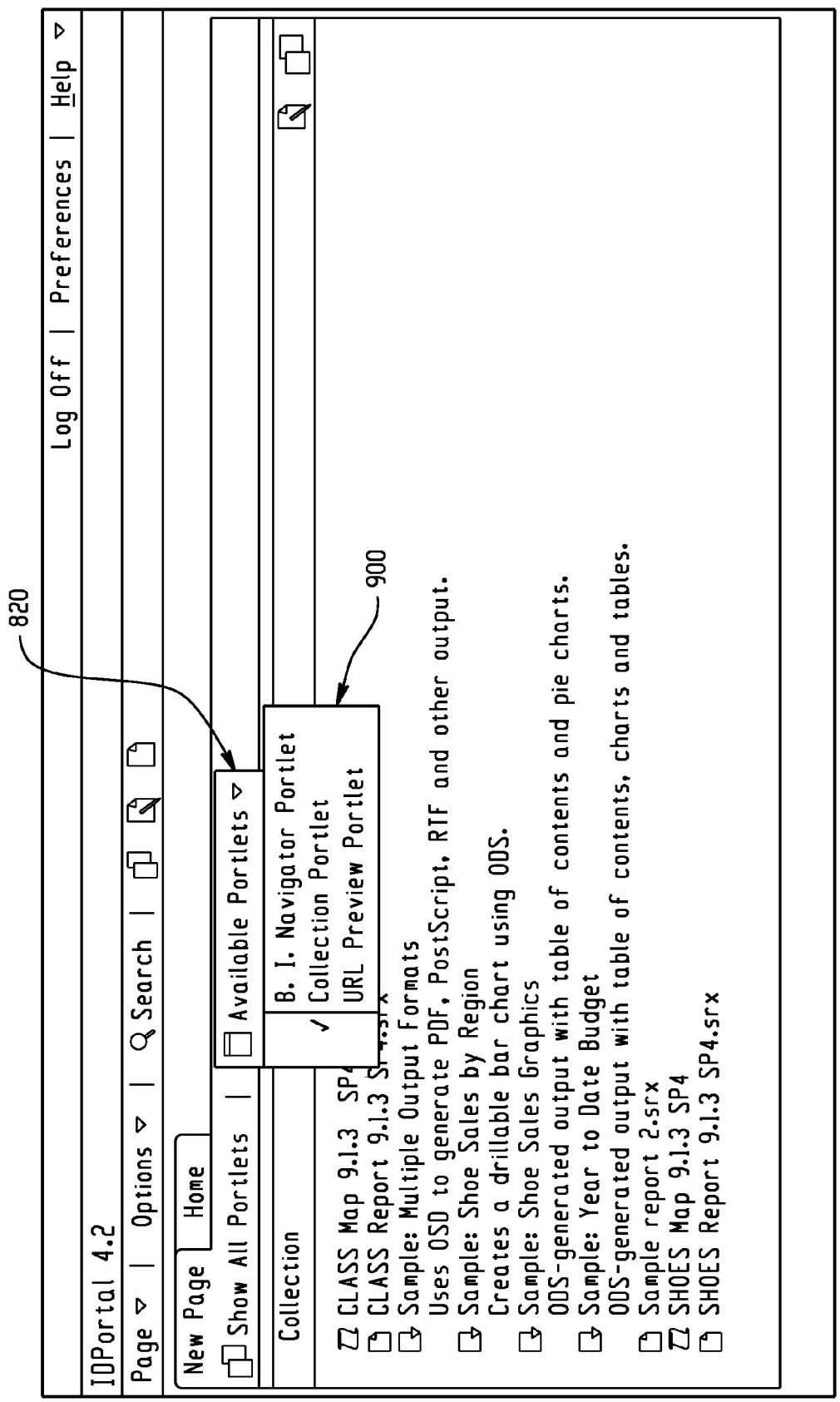
FIG. 10 is a graphical user interface illustrating the operation of a user interface item related to available portlets on a portal page.

FIG. 10 illustrates the operation of user interface item 820 ("Available Portlets"). Clicking on the user interface item 820 causes a list 900 to appear. This is an alternative to the portlet management menus shown in FIGS. 5 and 9 with respect to a user determining which portlets are available, which portlet is maximized, and with respect to switching quickly between portlets displayed in the maximized state.

The list 900 is displayed when user interface item 820 is selected by a user. The list 900 shows which portlet is maximized and which portlets are obscured but accessible. Users can switch the portlet being displayed in a maximized state by selecting currently hidden portlets in the list 900. For example, list 900 shows that the "Collection" portlet is currently maximized, and the other portlets, "SAS B.I. Navigator Portlet" and "SAS URL Preview Portlet," are currently obscured. If a user desired to switch the maximized portlet from the "Collection" portlet to the "SAS B.I. Navigator Portlet," the user can select "SAS B.I. Navigator Portlet" from the list 900. Such a selection would cause the "SAS B.I. Navigator Portlet" to become maximized as well as result in the "Collection" portlet becoming obscured. A check mark would then appear next to "SAS B.I. Navigator Portlet" in list 900.

Figure 11:
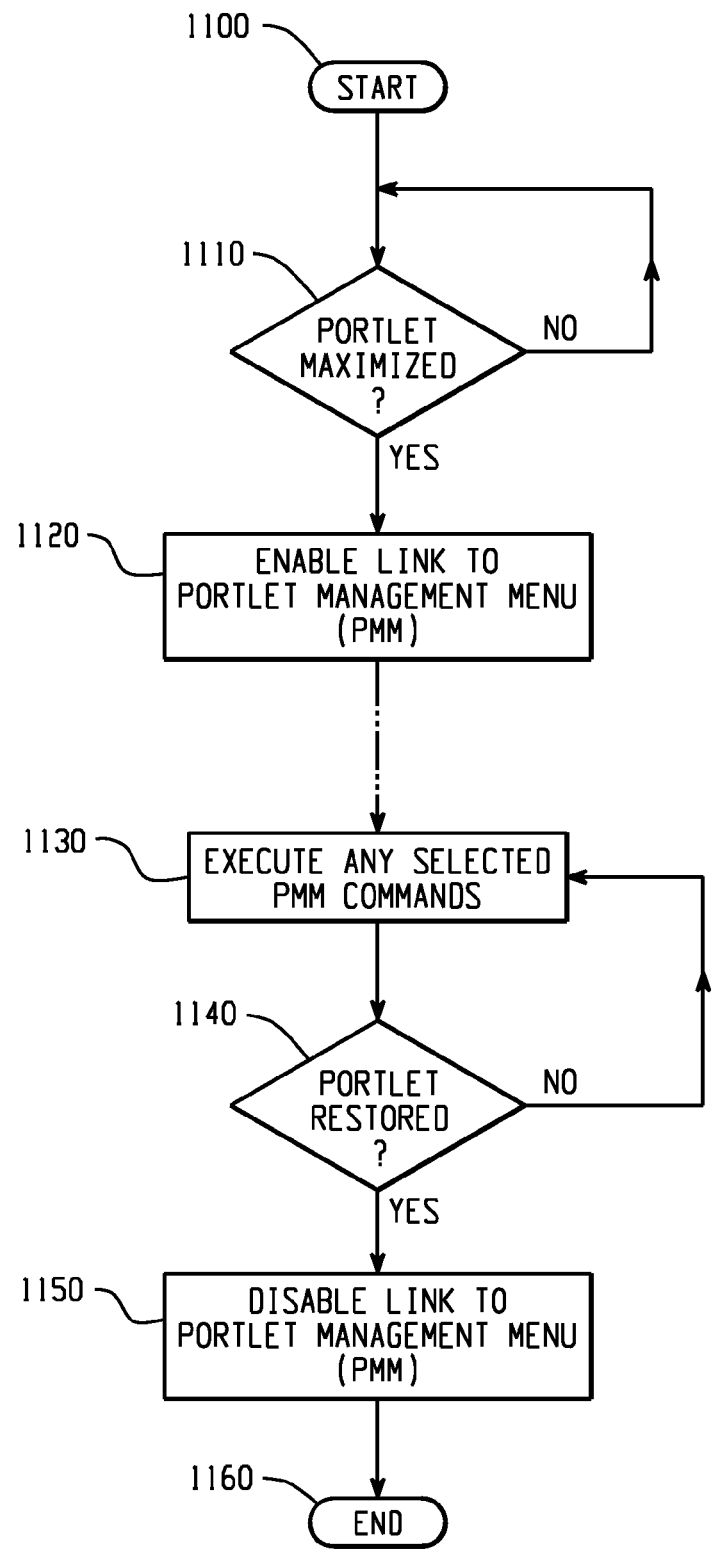
FIG. 11 depicts an operational scenario related to a portal management software system managing portlet visualization in a portal page.

FIG. 11 depicts an operational scenario for how a portal management software system can be configured to manage portlet visualization in a portal page. The scenario begins at start block 1100. Step 1110 examines whether any portlet is maximized. If none of the portlets are maximized, then processing waits until a portlet is maximized. If a portlet is maximized, processing continues to step 1120.

At step 1120, a link is enabled to a portlet management menu ("PMM"), and the portlet management toolbar becomes available. Once the link is enabled for a portal page, the system awaits further input from the user. When a user selects a PMM command, step 1130 executes any selected PMM commands. After executing any selected PMM commands, step 1140 examines whether the portlet is restored to its normal state. If the portlet remains in its maximized state, processing returns to step 1130. If the portlet is restored to its normal state, then step 1150 disables the link to the PMM and also hides the portlet management toolbar. Following step 1150, processing proceeds to end block 1160.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods for managing portlets can be used in many different environments because they can operate effectively across platforms. For example, portal pages enable users to access information through their personal computers, personal digital assistants (PDAs) and cellular phones.

Further it is noted that portal pages using the systems and methods described herein are typically web-based applications and can provide a number of capabilities, including: enabling user interface personalization, enabling a single sign on environment, aggregating and integrating content from different sources, and hosting information displays. More specifically, a portal page can provide a centralized web-based access point for information linked from other applications, combining that information in a single space. Users log on to a portal application, thereby gaining access to the various sources of information without having to log on separately to each source. Users experience a consistent format, look and feel for their interactions with various applications, and further benefit from an intuitive way to access many applications simultaneously. Users can also customize their own portal pages, based on individual preferences. It is noted that portlets are typically Java-based web components, managed by a portlet container that processes requests and generates dynamic content. Portlets are stand-alone applications that appear as sub-portions of a portal page, generally as a group of portlet windows within the portal page.

Figure 12:
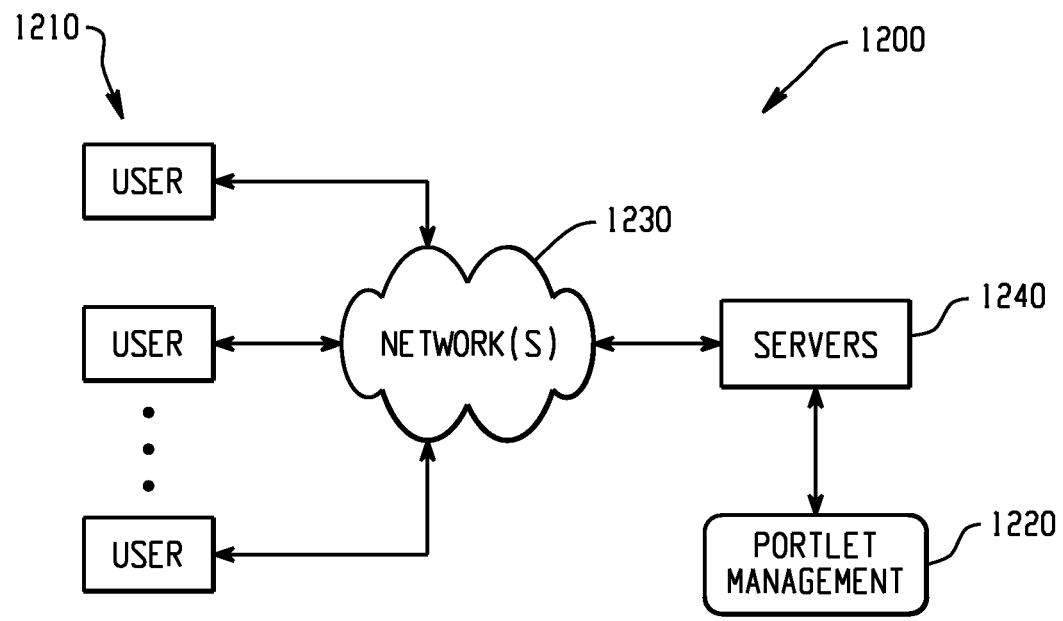
FIG. 12 is a block diagram depicting a networked environment wherein users can interact with a portlet management system.

As another example of the broad applicability of the systems and methods disclosed herein, the systems and methods may be implemented in various types of environments, such as for example on a networked system (as shown at 1200 on FIG. 12). FIG. 12 depicts an environment wherein users 1210 can interact with a portlet management system 1220 to handle display of portlets within the portal applications of the users 1210.

The users 1210 can interact with the system 1220 through a number of ways, such as over one or more networks 1230. One or more servers 1240 accessible through the network(s) 1230 can host the system 1220 and allow the system 1220 to download any software components and functionality onto the users' computers that they need to manage the display of portlets.

Figure 13:
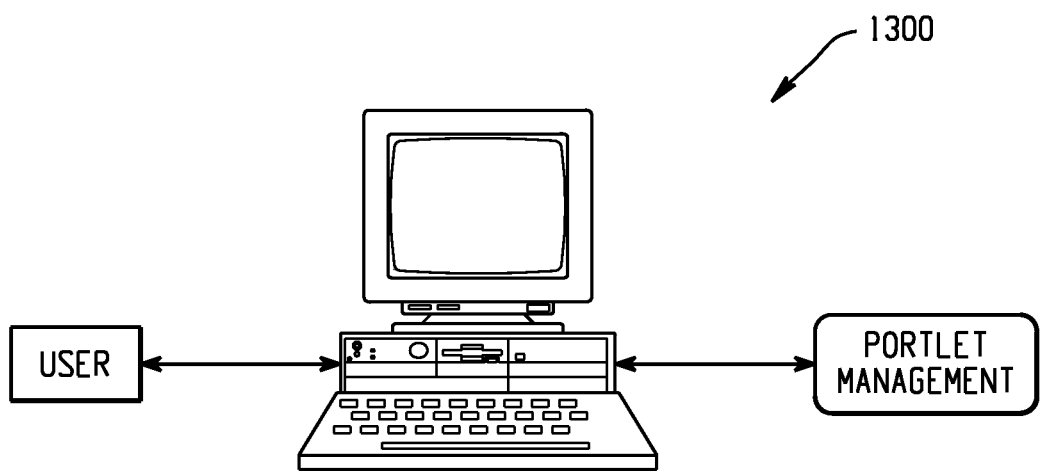
FIG. 13 is a block diagram depicting a single general purpose computer environment wherein a user can interact with a portlet management system.

It should be noted that the systems and methods can also be implemented in other environments, such as on a single general purpose computer or workstation as shown at 1300 on FIG. 13, or in an application service provider configuration.

It is further noted that the systems and methods may include data signals conveyed via networks (e.g., local area network, wide area network, internet, combinations thereof etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for displaying a portal page having a plurality of portlets, comprising:
   receiving, using one or more processors, state information indicating a normal state, wherein in the normal state, the plurality of portlets are visually displayed simultaneously;
   receiving, using the one or more processors, state information indicating a maximized state, wherein in the maximized state, a single portlet is visually displayed and a link to a corresponding portlet management menu is enabled, wherein the link is visible only when a portlet is in a maximized state, and wherein a portlet in a maximized state occupies the portal page such that the other portlets in the portal page are obscured and no longer visible;
   displaying, the one or more processors, a single portlet in the maximized state including a link to a corresponding portlet management menu having a list of portlets including the single portlet and any other portlets in the portal page, wherein a graphic indicating the maximized state appears adjacent to the single portlet on the list of portlets in the portlet management menu corresponding to the single portlet;
   receiving, using the one or more processors, a selection corresponding to a different portlet on the list of portlets, wherein the selection causes the different portlet to be placed in the maximized state; and
   displaying, using the one or more processors, the different portlet in the maximized state including a link to a corresponding portlet management menu having a list of portlets including the different portlet and any other portlets in the portal page, wherein a graphic indicating the maximized state appears adjacent to the different portlet on the list of portlets in the portlet management menu corresponding to the different portlet.

2. The method of claim 1, wherein the plurality of portlets are areas displayed on the portal page.

3. The method of claim 1, wherein the plurality of portlets are windows displayed on the portal page, and wherein the plurality of portlets include a title bar and one or more interface control items.

4. The method of claim 3, wherein the plurality of portlets include one or more links for web pages or a statistical graph.

5. The method of claim 1, wherein each portlet in the plurality of portlets has one or more display states, and wherein the display states include a maximum display state, a minimized display state, or a normal display state.

6. The method of claim 1, wherein the graphic indicator is displayed on a title bar of the single portlet.

7. The method of claim 1, wherein the portlet management menu is a floating toolbar on the single portlet.

8. The method of claim 1, wherein the portlet management menu includes one or more interactive interface items in addition to the list, and wherein interactive interface items include a restore operation and an edit operation.

9. The method of claim 1, further comprising:
   receiving state information indicating a return to the normal state, wherein in the normal state, the plurality of portlets are visually displayed simultaneously;
   disabling the link to the portlet management menu; and
   hiding the graphic indicator.

10. A computer-implemented system for displaying a portal page having a plurality of portlets, comprising:
    one or more processors;
    a computer-readable memory containing instructions to cause the one or more processors to perform operations, including:
    receiving state information indicating a normal state, wherein in the normal state, the plurality of portlets are visually displayed simultaneously;
    receiving state information indicating a maximized state, wherein in the maximized state, a single portlet is visually displayed and a link to a corresponding portlet management menu is enabled, wherein the link is visible only when a portlet is in a maximized state, and wherein a portlet in a maximized state occupies the portal page such that the other portlets in the portal page are obscured and no longer visible;
    displaying a single portlet in the maximized state including a link to a corresponding portlet management menu having a list of portlets including the single portlet and any other portlets in the portal page, wherein a graphic indicating the maximized state appears adjacent to the single portlet on the list of portlets in the portlet management menu corresponding to the single portlet;
    receiving a selection corresponding to a different portlet on the list of portlets, wherein the selection causes the different portlet to be placed in the maximized state; and
    displaying the different portlet in the maximized state including a link to a corresponding portlet management menu having a list of portlets including the different portlet and any other portlets in the portal page, wherein a graphic indicating the maximized state appears adjacent to the different portlet on the list of portlets in the portlet management menu corresponding to the different portlet.

11. A computer-readable storage medium encoded with instructions that cause a computer to perform a method for displaying a portal page having a plurality of portlets, comprising:
    receiving state information indicating a normal state, wherein in the normal state, the plurality of portlets are visually displayed simultaneously;
    receiving state information indicating a maximized state, wherein in the maximized state, a single portlet is visually displayed and a link to a corresponding portlet management menu is enabled, wherein the link is visible only when a portlet is in a maximized state, and wherein a portlet in a maximized state occupies the portal page such that the other portlets in the portal page are obscured and no longer visible;

displaying a single portlet in the maximized state including a link to a corresponding portlet management menu having a list of portlets including the single portlet and any other portlets in the portal page, wherein a graphic indicating the maximized state appears adjacent to the single portlet on the list of portlets in the portlet management menu corresponding to the single portlet;

receiving a selection corresponding to a different portlet on the list of portlets, wherein the selection causes the different portlet to be placed in the maximized state; and displaying the different portlet in the maximized state including a link to a corresponding portlet management menu having a list of portlets including the different portlet and any other portlets in the portal page, wherein a graphic indicating the maximized state appears adjacent to the different portlet on the list of portlets in the portlet management menu corresponding to the different portlet.

12. A computer-program product, tangibly embodied in a machine-readable storage medium, including instructions configured to cause a data processing apparatus to:

receive state information indicating a normal state, wherein in the normal state, the plurality of portlets are visually displayed simultaneously;

receive state information indicating a maximized state, wherein in the maximized state, a single portlet is visually displayed and a link to a corresponding portlet management menu is enabled, wherein the link is visible only when a portlet is in a maximized state, and wherein a portlet in a maximized state occupies the portal page such that the other portlets in the portal page are obscured and no longer visible;

display a single portlet in the maximized state including a link to a corresponding portlet management menu having a list of portlets including the single portlet and any other portlets in the portal page, wherein a graphic indicating the maximized state appears adjacent to the single portlet on the list of portlets in the portlet management menu corresponding to the single portlet;

receive a selection corresponding to a different portlet on the list of portlets, wherein the selection causes the different portlet to be placed in the maximized state; and display the different portlet in the maximized state including a link to a corresponding portlet management menu having a list of portlets including the different portlet and any other portlets in the portal page, wherein a graphic indicating the maximized state appears adjacent to the different portlet on the list of portlets in the portlet management menu corresponding to the different portlet.

* * * * *